US009964940B2

(12) United States Patent
Takeuchi et al.

(10) Patent No.: US 9,964,940 B2
(45) Date of Patent: May 8, 2018

(54) NUMERICAL CONTROLLER FOR PERFORMING AXIS CONTROL OF TWO PARALLEL AXES

(71) Applicant: FANUC CORPORATION, Minamitsuru-gun, Yamanashi (JP)

(72) Inventors: Yasushi Takeuchi, Yamanashi (JP); Makoto Suzuki, Yamanashi (JP); Motohiko Ito, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 159 days.

(21) Appl. No.: 15/228,415

(22) Filed: Aug. 4, 2016

(65) Prior Publication Data

US 2017/0045872 A1 Feb. 16, 2017

(30) Foreign Application Priority Data

Aug. 10, 2015 (JP) ................. 2015-158352

(51) Int. Cl.
*G05B 19/19* (2006.01)
*G05B 19/4155* (2006.01)

(52) U.S. Cl.
CPC ......... *G05B 19/19* (2013.01); *G05B 19/4155* (2013.01); *G05B 2219/40293* (2013.01);
(Continued)

(58) Field of Classification Search
CPC ................ G05B 19/19; G05B 19/4155; G05B 2219/40293; G05B 2219/49203; G05B 2219/50228
See application file for complete search history.

(56) References Cited

U.S. PATENT DOCUMENTS

| 4,999,784 A | 3/1991 | Kawamura et al. |
| 5,977,736 A | 11/1999 | Nakazato |

(Continued)

FOREIGN PATENT DOCUMENTS

| JP | H64051249 A | 2/1989 |
| JP | H03276206 A | 12/1991 |

(Continued)

OTHER PUBLICATIONS

Notification of Reasons for Refusal for Japanese Application No. 2015-158352, dated Sep. 25, 2017, including English translation, 7 pages.

(Continued)

*Primary Examiner* — Abdelmoniem Elamin
(74) *Attorney, Agent, or Firm* — RatnerPrestia

(57) ABSTRACT

A numerical controller performs cross-rail axis control that distributes moving amount to a first and second axes based on a command to a virtual axis. If a block of a program that is read out contains a fast feed command to the virtual axis for moving a tool to a cutting feed start point, the numerical controller distributes a moving amount commanded by the fast feed command to the first axis and the second axis. Further, the moving amount commanded by the fast feed command is distributed to the first axis and the second axis so that movement of the virtual axis commanded by a cutting feed command that follows the fast feed command in the program can be achieved by movement of only the first axis.

4 Claims, 9 Drawing Sheets

(52) U.S. Cl.
CPC .............. *G05B 2219/49203* (2013.01); *G05B 2219/50228* (2013.01)

(56) References Cited

U.S. PATENT DOCUMENTS

| | | | |
|---|---|---|---|
| 8,093,856 B2* | 1/2012 | Miyaji | G05B 19/19 112/117 |
| 9,063,536 B2* | 6/2015 | Otsuki | G05B 19/4086 |
| 9,400,496 B2* | 7/2016 | Haga | G05B 19/408 |
| 9,511,465 B2* | 12/2016 | Yamanishi | B23Q 11/126 |
| 9,891,616 B2* | 2/2018 | Tanabe | G05B 19/408 |
| 2008/0082202 A1 | 4/2008 | Hasebe et al. | |
| 2008/0254959 A1* | 10/2008 | Takayama | B23Q 1/5412 483/32 |
| 2010/0109594 A1* | 5/2010 | Miyaji | G05B 19/19 318/632 |
| 2010/0296886 A1 | 11/2010 | Prust et al. | |
| 2012/0187890 A1* | 7/2012 | Otsuki | G05B 19/4086 318/570 |
| 2013/0071198 A1* | 3/2013 | Kiryu | B23Q 15/013 409/80 |
| 2014/0010611 A1* | 1/2014 | Yamanishi | B23Q 11/126 409/135 |
| 2014/0088755 A1* | 3/2014 | Haga | G05B 19/408 700/190 |
| 2015/0177728 A1* | 6/2015 | Haraguchi | G05B 19/19 700/193 |
| 2017/0043441 A1* | 2/2017 | Yamanishi | B23Q 11/126 |

FOREIGN PATENT DOCUMENTS

| | | |
|---|---|---|
| JP | H05237741 A | 9/1993 |
| JP | H10027013 A | 1/1998 |
| JP | H10143213 A | 5/1998 |
| JP | 2001087987 A | 4/2001 |
| JP | 2003-022106 A | 1/2003 |
| JP | 2008090463 A | 4/2008 |

OTHER PUBLICATIONS

Decision to Grant a Patent for Japanese Application No. 2015-158352, dated Dec. 12, 2017, including English translation, 6 pages.

* cited by examiner

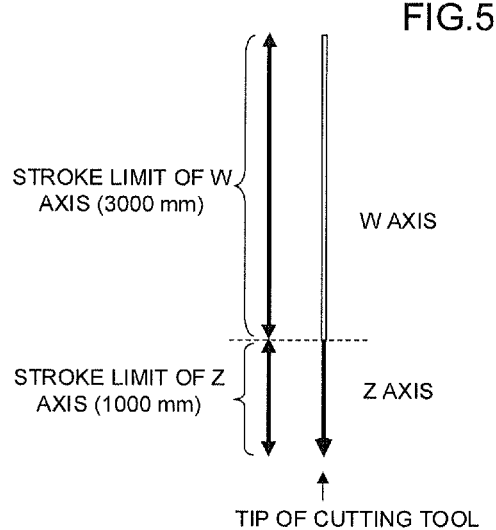
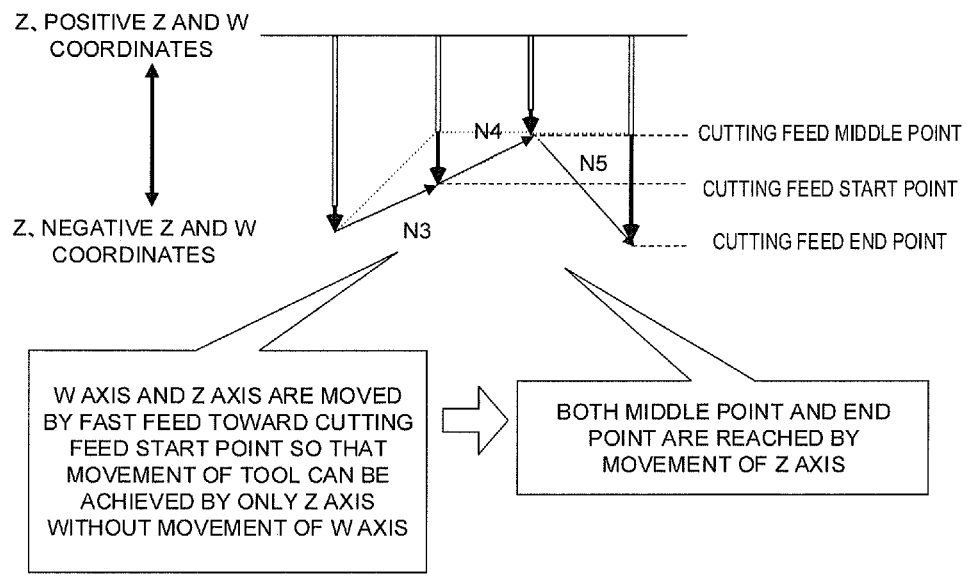
FIG.5

FIG.8

```
O0001
N1 G00 G90 Z100.0 W100.0;
N2 G51.7 Q30;  ←------- TURN ON CROSS-RAIL AXIS CONTROL MODE (DISTRIBUTION RATIO OF 30%)
N3 G91 G01 V100.0 F1000.0;  ←------- MOVEMENT BY 30.0 mm IN W-AXIS POSITIVE DIRECTION AT 300 mm/min
                                     MOVEMENT BY 70.0 mm IN Z-AXIS POSITIVE DIRECTION AT 700 mm/mi
N4 G91 G00 V100.0;  ←------- MOVEMENT BY 30.0 mm IN W-AXIS POSITIVE DIRECTION AT 30% OF FAST FEED SPEED OF V AXIS
                             MOVEMENT BY 70.0 mm IN Z-AXIS POSITIVE DIRECTION AT 70% OF FAST FEED SPEED OF V AXIS
N5 G50.7;  ←------- TURN OFF CROSS-RAIL AXIS CONTROL MODE
N6 G91 G01 W100.0 F1000.0;  ←------- MOVEMENT BY 100.0 mm IN W-AXIS POSITIVE DIRECTION AT 1000 mm/min
N7 G91 G01 Z100.0 F1000.0;  ←------- MOVEMENT BY 100.0 mm IN Z-AXIS POSITIVE DIRECTION AT 1000 mm/min
M30
```

NUMERICAL CONTROLLER FOR PERFORMING AXIS CONTROL OF TWO PARALLEL AXES

BACKGROUND OF THE INVENTION

Field of the Invention

The present invention relates to a numerical controller, and particularly to a numerical controller that performs axis control in which two parallel axes are taken as one virtual axis.

Description of the Related Art

FIG. 7 shows the configuration of a double-column machining center.

A large, double-column machining center has a machine configuration in which a W axis (Wm axis, Ws axis) is accompanied by a Z axis parallel to the W axis, as shown in FIG. 7. A drill, an end mill, or any other cutting tool attached to the Z axis cuts a workpiece. Use of the W axis and the Z axis allows a long stroke to be achieved. Controlling the two axes, the W axis and the Z axis, with the two axes taken as one virtual axis (V axis) is called cross-rail axis control.

A cross-rail axis control function is a function used in a machine configuration in which an axis (the W axis in the example in FIG. 7, a master axis) is accompanied by another axis parallel to the axis (the Z axis in the example in FIG. 7, a slave axis) and configured to control the two axes as one virtual axis (the V axis in the example in FIG. 7). During a cross-rail axis control mode, a command for one axis (V axis) is used to simultaneously control the travel/speed of the two axes (W axis, Z axis) in such a way that the tip of a cutting tool moves as intended by a program command. In the cross-rail axis control, a stroke commandable to the V axis is the sum of the strokes of the two axes (stroke of W axis and stroke of Z axis). The cross-rail axis control is similarly applicable to a boring machine having two parallel axes.

A description example and action of the cross-rail axis control function in an NC program will be described with reference to FIG. 8.

When the cross-rail axis control function is used, and it is desired to perform the cross-rail axis control in an NC program, a command "G51.7" is used to turn on the cross-rail axis control mode and command axis movement based on the cross-rail axis control, and when the cross-rail axis control is completed, a command "G50.7" is used to turn off the cross-rail axis control mode.

In FIG. 8, the command "G51.7" is used in the block N2 to turn on the cross-rail axis control mode. The command Q after the command "G51.7" represents a distribution ratio in accordance with which a travel is distributed to the W axis, and in the example of FIG. 8 ("Q30"), 30% of a travel is distributed to the W axis (70% to Z axis).

When a movement command is issued to the V axis after the cross-rail axis control mode is turned on, the travel and feed speed commanded to the V axis is distributed to the W axis and the Z axis in accordance with the distribution ratio set by the Q command, as indicated by the blocks N3 and N4. For example, since a cutting feed command (G01) that specifies a travel of 100.0 mm and a feed speed of 1000.0 mm/min is issued to the V axis in the block N3, the movement of the W axis is performed so that the travel is 30.0 mm and the feed speed is 300 mm/min and the movement of the Z axis is performed so that the travel is 70.0 mm and the feed speed is 700 mm/min in accordance with the distribution ratio.

On the other hand, since the cross-rail axis control mode has been turned off in the blocks N6 and N7, the machine is driven in a normal mode, in which individual movement commands need to be issued to the W axis and the Z axis. Issuing a movement command to the V axis in the state in which the cross-rail axis control mode is not in operation results in an alarm.

Japanese Patent Application Laid-Open No. 2003-022106 discloses an example of a technology for controlling a machine having two parallel axes, such as those described above. The technology is intended to solve the following problem:

To increase the travel of a cutting tool relative to a workpiece by use of a plurality of parallel control axes, it is necessary to specify the relationship among the plurality of parallel control axes in an NC program installed in a numerical controller that controls a machining center. The reason for this is as follows: To make full use of the strokes of the plurality of (first and second) parallel control axes, in the state in which the first control axis is in operation, the second control axis, which is parallel to the first control axis, needs to be moved to an appropriate position in advance so that the stroke limit of the first control axis is not reached. In the state in which the first control axis is in operation, when the stroke limit of the first control axis is reached, the machining is terminated. However, creation of the NC program described above is a relatively difficult, very time-consuming task. Therefore, even when a machining center has a plurality of parallel control axes, the fact that creation of an NC program is a difficult and time-consuming task prevents frequent practical use of the plurality of parallel control axes in prior art.

The technology disclosed in Japanese Patent Application Laid-Open No. 2003-022106 described above has been made in view of the problem described above and aims to provide a numerical controller and a machine tool controlled by the numerical controller, in which the machine tool has a plurality of parallel axes and the numerical controller is configured to be capable of effectively using the stroke of each of the axes of the machine tool by causing the plurality of axes to be cooperatively driven without creation of a complex NC program.

The technology disclosed in Japanese Patent Application Laid-Open No. 2003-022106 described above allows a machine tool having a plurality of parallel axes to effectively use the stroke of each of the axes without use of a machining program command that moves each of the control axes but only with a command for one axis direction so that the range over which the machine tool can perform machining can be used to the maximum, whereby the performance of the machine tool can be brought out to the maximum. As described above, the technology allows a double-column machine and a boring machine to perform axis control in such a way that strokes of two parallel axes are maximized.

In the technology disclosed in Japanese Patent Application Laid-Open No. 2003-022106 described above, the procedure of control action in which the plurality of axes are cooperated with each other on the basis of a command in a machining program will be described with reference to the flowchart of FIG. 9. The flowchart shows control in a case where one command is used to cooperatively move the Z axis and the W axis, which move in the same direction.

[Step SZ01] It is determined whether or not a commanded movement end point has been reached. When the movement end point has been reached, the present process is terminated, whereas when the movement end point has not been reached, the process proceeds to step SZ02.

[Step SZ02] The travel of the Z axis is determined, and a position specifying output is given to the Z axis on the basis of the determined travel.

[Step SZ03] It is determined whether or not the stroke limit of the Z axis has been reached. When the stroke limit of the Z axis has been reached, the process proceeds to step SZ04, whereas when the stroke limit has not been reached, the process returns to step SZ01.

[Step SZ04] The travel of the W axis is determined, and a position specifying output is given to the W axis on the basis of the determined travel.

[Step SZ05] It is determined whether or not the commanded movement end point has been reached. When the movement end point has been reached, the present process is terminated, whereas when the movement end point has not been reached, the process returns to step SZ04.

In a double-column machine, such as that shown in FIG. 7, however, in machining performed at a cutting feed speed instead of a fast feed speed, machining performed by movement of the Z axis instead of movement of the W axis, which are less precise and slower than the Z axis, provides better machining results in terms of machining speed and machining precision. However, creation of an NC program in consideration of an axis controlled in accordance with a machining situation as described above undesirably causes an operator to spend a large amount of effort. This problem cannot be solved by the prior art disclosed in Japanese Patent Application Laid-Open No. 2003-022106 described above.

SUMMARY OF THE INVENTION

The present invention relates to the cross-rail axis control and aims to provide a numerical controller having a function of automatically selecting an axis to be controlled in consideration of machining precision and machining speed in accordance with a machining situation.

A numerical controller according to the present invention allows machining of a workpiece by controlling a machine based on a program and includes: a first axis that directly moves a tool; and a second axis that indirectly moves the tool in association with the movement of the first axis in the direction in which the first axis moves, wherein the movement of the first axis and the movement of the second axis are allowed to be commanded in the program in such a way that the first and second axes are taken as one virtual axis. The numerical controller further includes: a program read unit that sequentially reads blocks in the program; and a cooperative drive analysis unit configured to distribute, when a block read by the program read unit contains a block of fast feed command to the virtual axis for moving the tool to a cutting feed start point, a moving amount commanded by the fast feed command to the first axis and the second axis. And the cooperative drive analysis unit is configured to distribute the moving amount commanded by the fast feed command to the first axis and the second axis so that movement of the virtual axis commanded by continuous blocks of cutting feed command that follow the block of fast feed command in the program can be achieved by movement of only the first axis.

When the movement of the virtual axis commanded by the continuous blocks of cutting feed command that follow the block of fast feed command in the program can not be achieved by movement of only the first axis, the cooperative drive analysis unit may first adjust the movement of the first axis and the movement of the second axis based on the continuous cutting feed commands so that a movement of the second axis in the continuous cutting feed commands is minimized, and then may distribute the moving amount commanded by the fast feed command to the first axis and the second axis so that the adjusted movements of the first axis and the second axis based on the continuous cutting feed commands are enabled.

The cooperative drive analysis unit may be configured to distribute the moving amount commanded by the fast feed command to the first axis and the second axis so that travelling times of the first axis and the second axis based on the fast feed command are minimized.

According to the present invention, movement commands of two or more parallel control axes (W axis and Z axis) are not necessarily considered in creation of an NC program, but a command for only a one virtual axis (V axis) in a cutting feed block allows movement of the Z axis without moving the W axis, whereby machining can be performed with precision at high speed. Further, in a case where only movement of the Z axis does not suffice and movement of the W axis is required, the W axis and the Z axis are cooperatively driven in such a way that the movement of the W axis is minimized, whereby a decrease in the speed can be minimized.

BRIEF DESCRIPTION OF THE DRAWINGS

The object and features of the present invention described above and other objects and features thereof will be apparent from the description of the following embodiment with reference to the accompanying drawings:

FIG. 5 shows an example of the cooperative action control performed by the numerical controller shown in FIG. 3;

FIG. 8 is an example of a program of cross-rail axis control according to prior art.

DETAILED DESCRIPTION OF THE PREFERRED EMBODIMENTS

Figure 1:
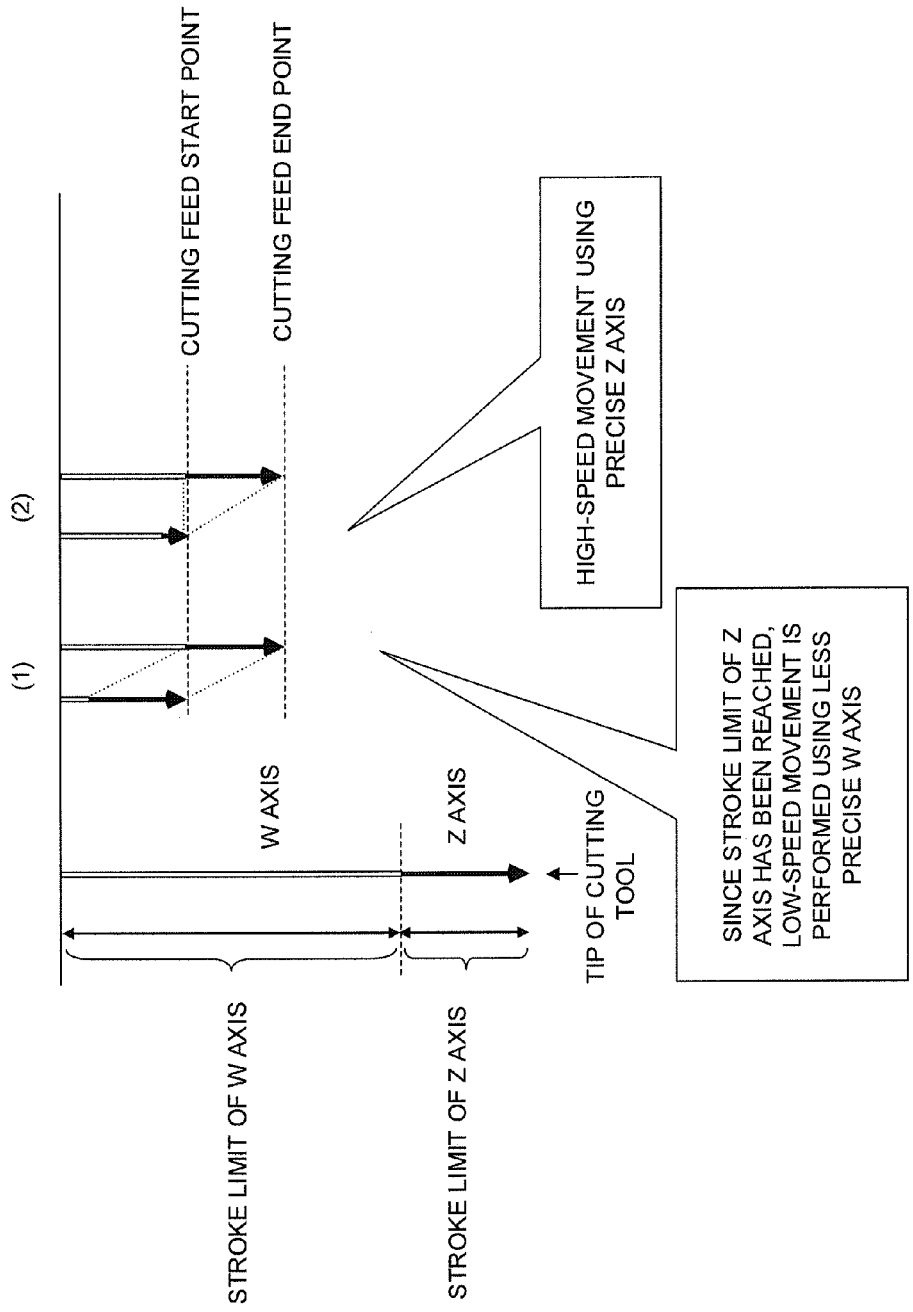
FIG. 1 shows a technical concept of the present invention.

An embodiment of the present invention will be described below with reference to the drawings. The same configurations as those in the prior art or configurations similar to those in the prior art have the same reference characters in the description.

In the present invention, in a case where cutting feed commands (G01, G02, and G03) are issued in one block or issued continuously over at least two blocks, the problem with the prior art described above is solved by cooperatively reading the cutting feed blocks in advance and cooperatively driving the W axis and the Z axis in such a way that only movement of the Z axis suffices without moving the W axis or with the movement of the W axis kept to a minimum in the cutting feed blocks.

FIG. 1 shows a technical concept of the present invention.

Figure 7:
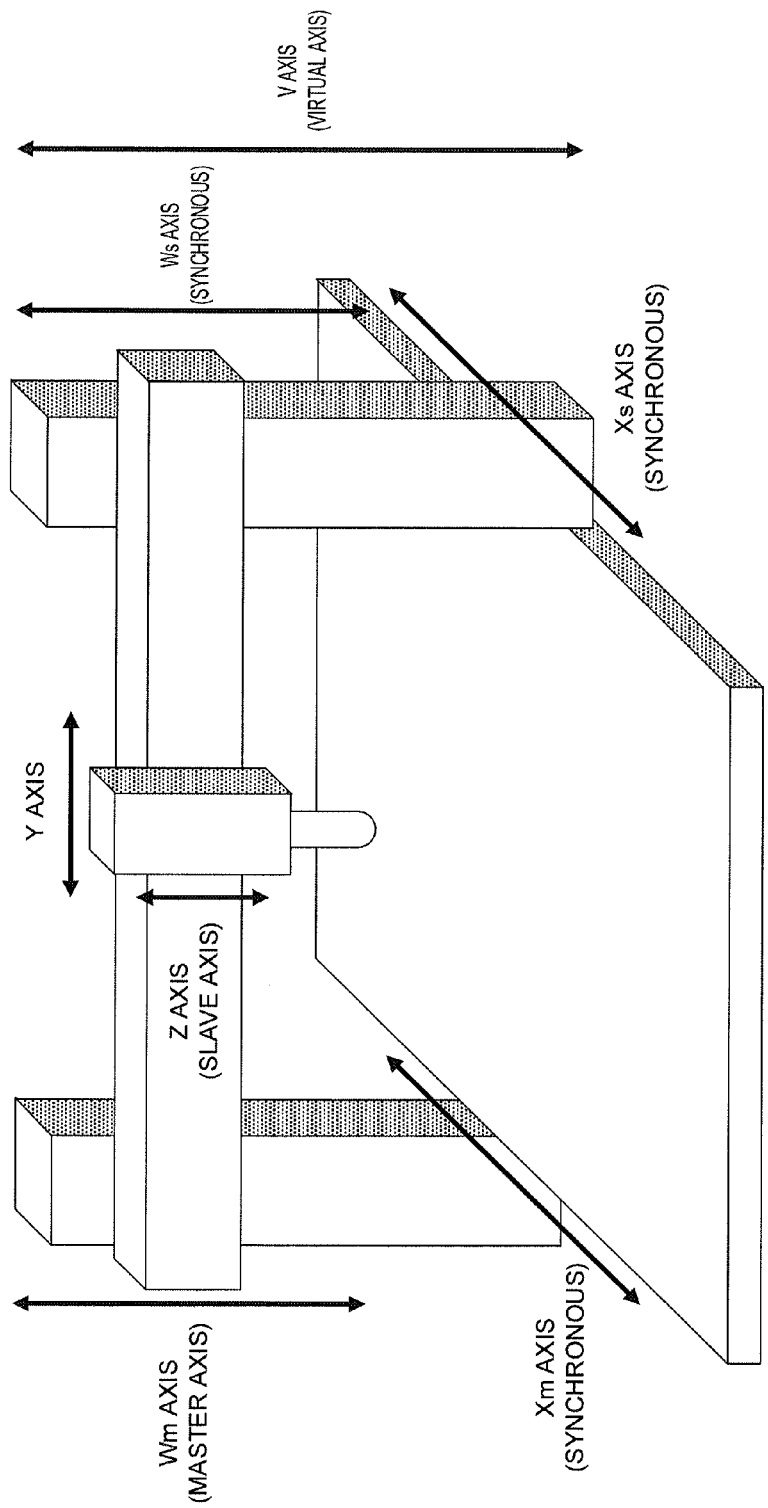
FIG. 7 shows the configuration of a double-column machining center.
Figure 9:
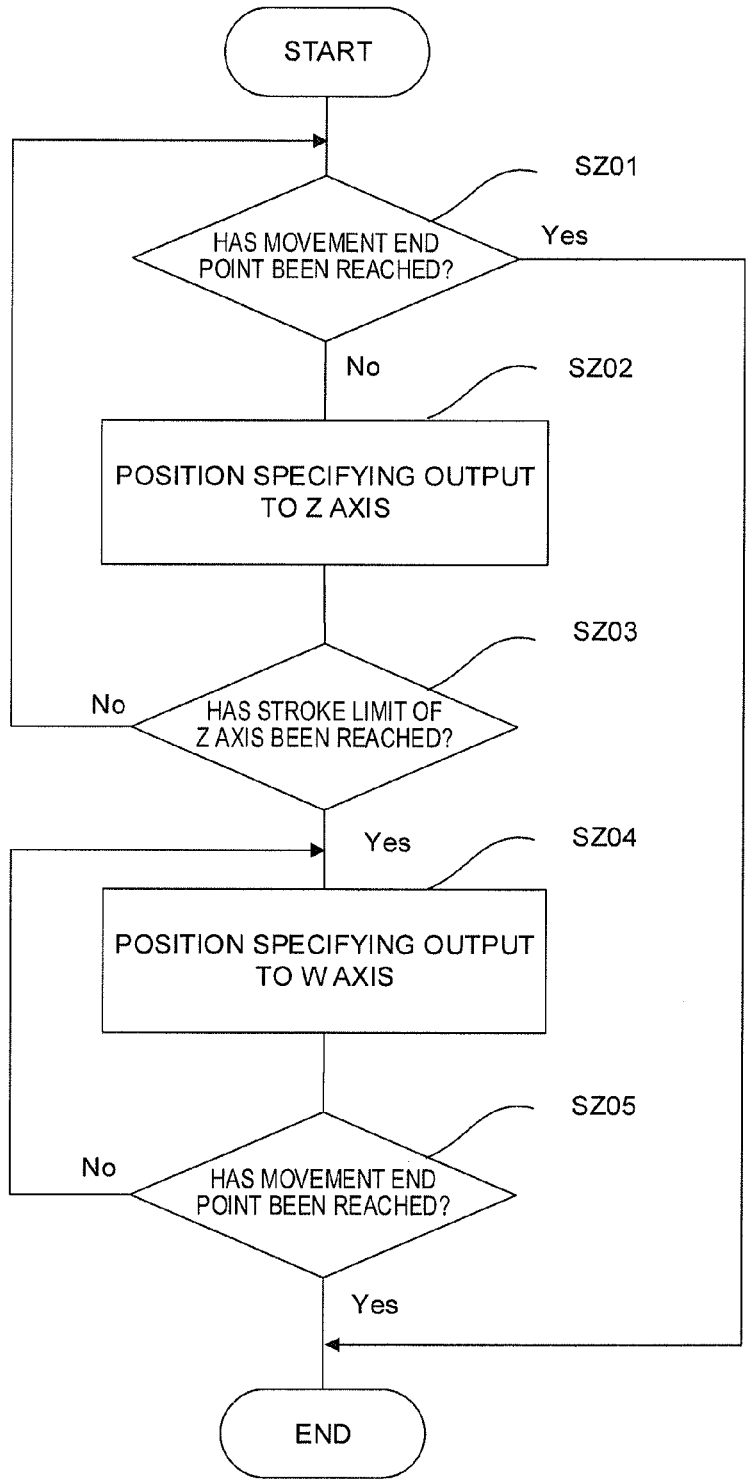
FIG. 9 is a flowchart showing the procedure of control action disclosed in a prior art document in which a plurality of axes are cooperated on the basis of a command in a machining program.

In FIG. 1, each solid-line thick arrow represents a stroke of the Z axis, and each open arrow represents a stroke of the W axis. In general, in a double-column machining center, such as that shown in FIG. 7, the W axis is less precise and slower than the Z axis, as described above. However, in a case where the W axis and the Z axis are cooperatively driven as the V axis, if a cutting tool is located at a cutting feed start point and the Z axis has been reached the stroke limit, as shown in (1) of FIG. 1, it is inevitable to move the W axis, which is less precise, at low speed for performing the cutting feed.

In the present invention, in the fast feed in which the cutting tool is moved to the cutting feed start point, the cutting tool is moved to the cutting feed start point while adjusting the fast feed amounts of the W axis and the Z axis so that the movement of the cutting tool based on the cutting feed blocks may be achieved mostly by the movement of the Z axis, as shown in state (2) in FIG. 1, and then the W axis and the Z axis are cooperatively driven in a manner such that the movement of the tool can be achieved by moving the Z axis, not moving the W axis, or keeping the movement of the W axis to a minimum, in the cutting feed blocks.

Figure 2:
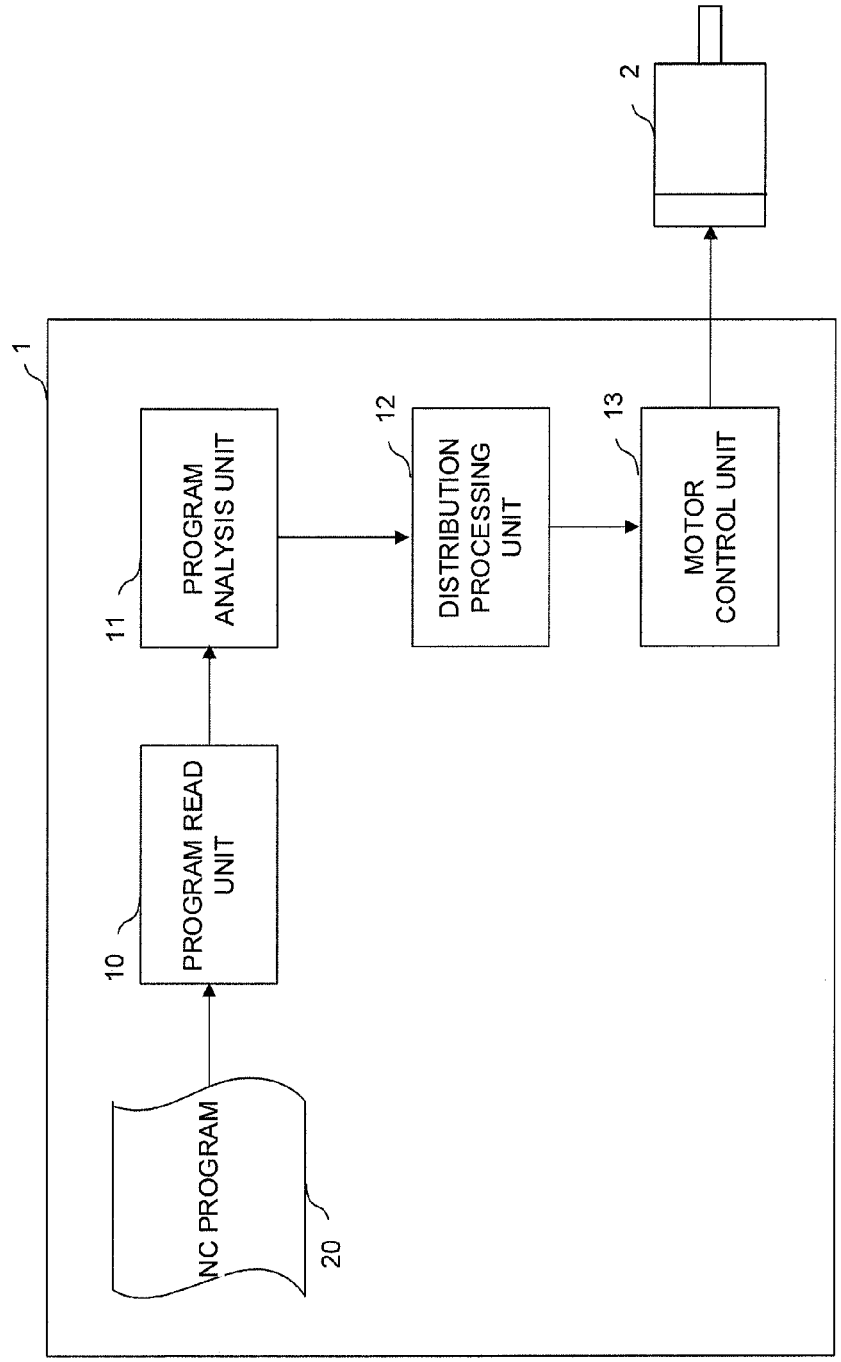
FIG. 2 is a functional block diagram of an example of a numerical controller according to prior art.

FIG. 2 is a functional block diagram of a numerical controller according to prior art.

A numerical controller 1 according to prior art includes a program read unit 10, a program analysis unit 11, a distribution processing unit 12, and a motor control unit 13. In FIG. 2, one motor control unit 13 and one motor 2 are provided for ease of description, but a plurality of motor control units 13 and motors 2 are actually provided so that the number thereof coincides with the number of axes to be controlled.

The program read unit 10 reads an NC program 20 from a memory (not shown) and outputs the NC program 20 to the program analysis unit 11. The program analysis unit 11 analyzes each block in the NC program 20 received from the program read unit 10 to create data on movement commands and outputs the created data to the distribution processing unit 12.

The distribution processing unit 12 determines a distributed moving amount to be commanded to each axis drive unit (motor 2 associated with each axis) on a distribution cycle basis on the basis of the data on the movement commands received from the program analysis unit 11 and outputs the determined distributed moving amount to the motor control unit 13 associated with the axis. The motor control unit 13 then drives and controls the motor 2 on the basis of the distributed moving amount received from the distribution processing unit 12.

Figure 3:
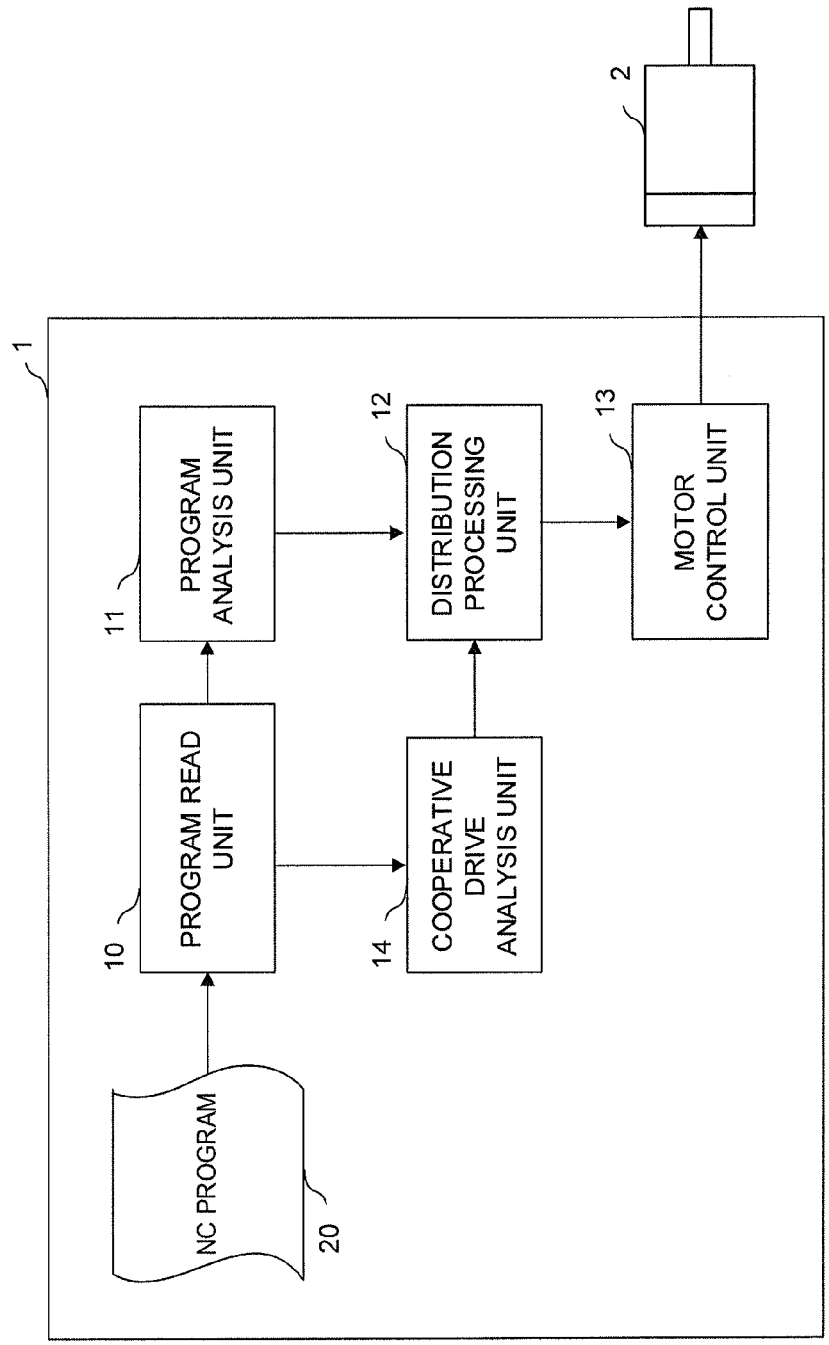
FIG. 3 is a functional block diagram of a numerical controller according to an embodiment of the present invention.

FIG. 3 is a functional block diagram of a numerical controller according to an embodiment of the present invention.

The numerical controller 1 according to the present embodiment includes the program read unit 10, the program analysis unit 11, the distribution processing unit 12, and the motor control unit 13 and further includes a cooperative drive analysis unit 14. In FIG. 3, one motor control unit 13 and one motor 2 are provided for ease of description, but a plurality of motor control units 13 and motors 2 are actually provided so that the number thereof coincides with the number of axes to be controlled.

In the drive operation of the machine according to prior art, the program read unit 10 reads the NC program 20, the program analysis unit 11 analyzes each block in the read NC program 20, and the distribution processing unit 12 is directly notified of results of the analysis, as described above.

In contrast, in the numerical controller 1 according to the present embodiment, the cooperative drive analysis unit 14 performs the following control at the start point of each of the cutting feed commands (G01, G02, and G03):

When the cutting feed start point is read in the NC program 20, more specifically, when a fast feed block is followed by the cutting feed commands to be issued in one block or a fast feed block is followed by the cutting feed commands to be issued continuously over at least two blocks, the program read unit 10 in the present embodiment issues reads the cutting feed blocks in advance and outputs the fast feed block and the cutting feed blocks read in advance to the cooperative drive analysis unit 14 instead of the program analysis unit 11.

The cooperative drive analysis unit 14 performs the analysis in such a way that the W axis and the Z axis are moved by a fast feed command (G00) toward the cutting feed start point so that the travelling time can be minimized on the basis of fast feed speeds of the W axis and the Z axis which are specified in advance in a manner such that the target movement can be achieved by only movement of Z axis without movement of W axis between the coordinates in a block where the positive Z coordinate (or V coordinate) is maximized and the coordinates in a block where the negative Z coordinate (or V coordinate) is minimized, among the cutting feed blocks received from the program read unit 10.

In the case where the cutting feed commands are present in one block and only movement of the Z axis does not give a sufficient stroke and movement of the W axis is required, the cooperative drive analysis unit 14 performs the analysis in such a way that the W axis and the Z axis are cooperatively driven so that the movement of the W axis is minimized.

Further, in the case where the cutting feed commands are present continuously over at least two blocks, when only movement of the Z axis does not give a sufficient stroke and movement of the W axis is required, the cooperative drive analysis unit 14 performs the analysis in such a way that the W axis and the Z axis are moved toward the cutting feed start point by the fast feed command (G00) so that the travelling time can be minimized on the basis of the fast feed speeds of the W axis and the Z axis which are specified in advance in a manner such that movements commanded by the largest possible number of continuous command blocks can be achieved by the movement of only Z axis, without movement of W axis. Regarding a block where movement of the W axis is required, the cooperative drive analysis unit 14 performs the analysis in such a way that the W axis and the Z axis are cooperatively driven so that the movement of the W axis is minimized. In such a block, for cooperatively driving the W axis and the Z axis, if the W axis and the Z axis have to be cooperatively driven from a block immediately before that block, the cooperative drive analysis unit 14 performs the analysis in such a way that the W axis and the Z axis are cooperatively driven.

Further, in the case where only movement of the Z axis does not give a sufficient stroke and movement of the W axis is required, the numerical controller may be configured to offer a selection of a mode in which the W axis and the Z axis are cooperatively driven in such a way that the movement of the W axis is minimized in every cutting feed block.

Figure 4:
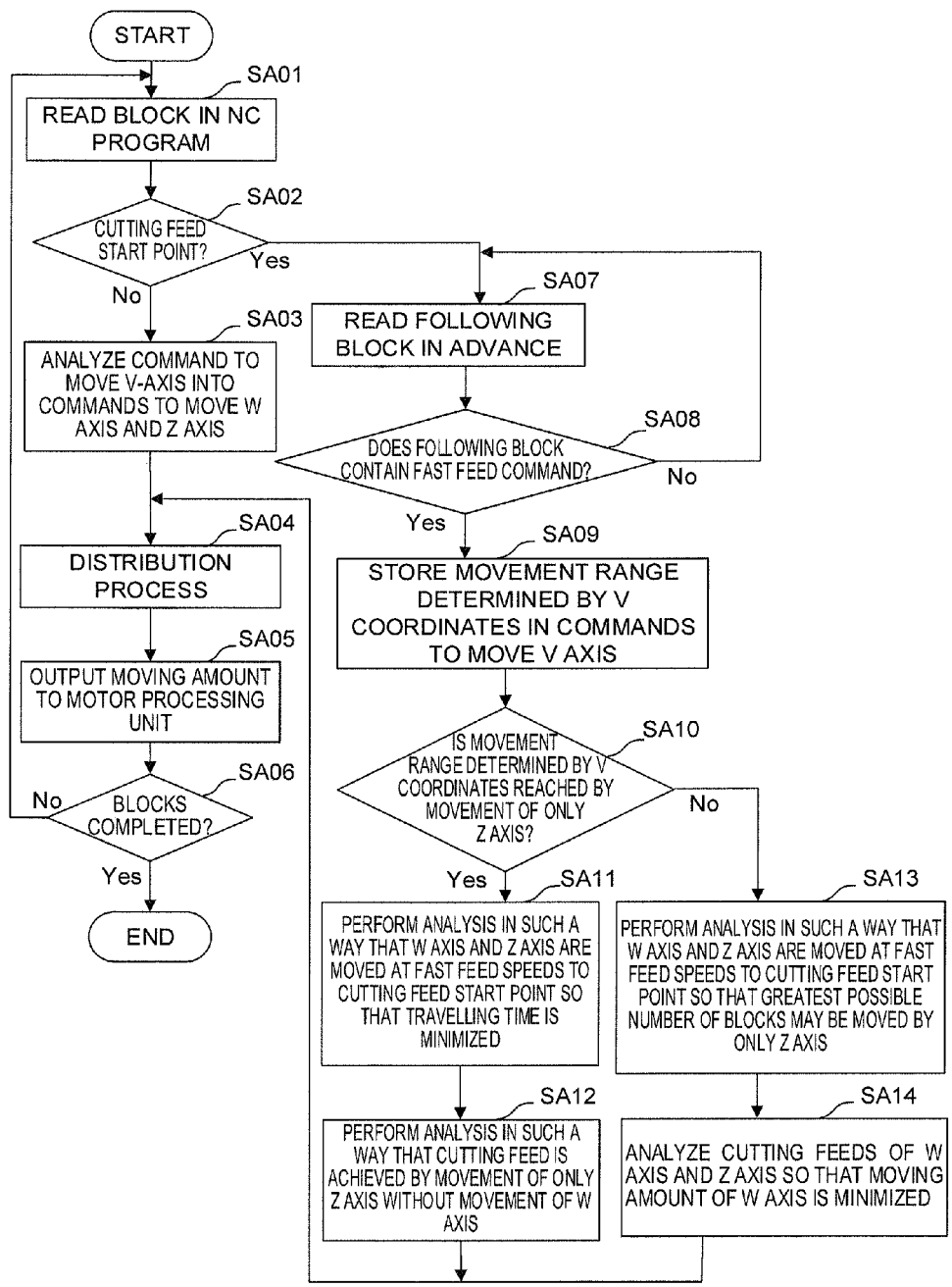
FIG. 4 is a flowchart showing the procedure of cooperative action control in response to a feed command to a V axis in a cross-rail axis control mode in the numerical controller shown in FIG. 3.

FIG. 4 is a flowchart showing the procedure of cooperative action control in response to a feed command to the V axis in the cross-rail axis control mode in the numerical controller 1 including the functional blocks shown in FIG. 3. The flowchart shows the procedure of the cooperative action control in a case where the NC program 20 only contains feed commands (fast feed command, cutting feed command) for ease of description.

[Step SA01] The program read unit 10 reads a block in the NC program 20 from the memory.

[Step SA02] The program read unit 10 determines whether or not the block read in step SA01 is a block containing fast feed command that moves the cutting tool to the cutting feed start point.

Whether or not the read block contains a fast feed command that moves the cutting tool to the cutting feed start point is determined as follows: It is first determined whether the read block is a fast feed block or not; when the read block is a fast feed block, it is further determined whether or not the fast feed block is followed by one or more cutting feed commanding blocks; and when the fast feed block is followed by one or more cutting feed commanding blocks, it is determined that the fast feed block contains a command that moves the cutting tool to the cutting feed start point.

When the block read in step SA01 is a block containing a fast feed command that moves the cutting tool to the cutting feed start point, the process proceeds to step SA07, whereas when the block read in step SA01 is any other block, the process proceeds to step SA03.

[Step SA03] The program analysis unit 11 analyzes a command to move the V axis in the block read in step SA01 to be a command to move the W axis and the Z axis by using a distribution ratio specified, for example, by a Q command.

[Step SA04] The distribution processing unit 12 determines a distributed moving amount commanded to each axis drive unit on a distribution cycle basis on the basis of data on the movement command received from the program analysis unit 11 or the cooperative drive analysis unit 14.

[Step SA05] The distribution processing unit 12 outputs the distributed moving amount for each axis determined in step SA04 to the motor control unit 13 for each axis.

[Step SA06] It is determined whether or not the blocks in the NC program are completed. When a result of the determination shows that the blocks are completed, the process is terminated, whereas when the result of the determination shows that the blocks are not completed, the process returns to step SA01.

[Step SA07] The program read unit 10 reads in advance blocks that follow the fast feed blocks read in step SA02 from the NC program 20.

[Step SA08] The program read unit 10 determines whether or not the block that follows the blocks read in advance in step SA07 contains a fast feed command. When the following block contains a fast feed command, the process proceeds to step SA09, otherwise (when the following block contains a cutting feed command) the process returns to step SA07.

[Step SA09] The cooperative drive analysis unit 14 stores a maximum V coordinate in the positive direction and a minimum V coordinate in the negative direction (movement range), among the commands for the V axis in all the cutting feed blocks read in advance in step SA07.

[Step SA10] The cooperative drive analysis unit 14 determines whether or not the maximum V coordinate in the positive direction and the minimum V coordinate in the negative direction is reached by only movement of the Z axis. When the coordinates are reached by only movement of the Z axis, the process proceeds to step SA11, otherwise the process proceeds to step SA13.

[Step SA11] The cooperative drive analysis unit 14 performs analysis in such a way that the W axis and the Z axis are moved by fast feed (fast feed command G00 read in step SA01) toward the cutting feed start point so that that the movement of the tool can be achieved by only movement of Z axis without movement of W axis for all the cutting blocks read in advance in a manner such that the travelling time can be minimized on the basis of fast feed speeds of the W axis and the Z axis which are specified in advance.

[Step SA12] The cooperative drive analysis unit 14 performs analysis in such a way that the movement of the tool can be achieved by only movement of Z axis without movement of W axis for the cutting blocks read in advance, and the process returns to step SA04.

[Step SA13] The cooperative drive analysis unit 14 performs analysis in such a way that the W axis and the Z axis are moved by fast feed (fast feed command G00 read in step SA01) toward the cutting feed start point so that that the movement of the tool can be achieved by only movement of Z axis without movement of W axis for greatest possible number of continuously commanded blocks among all the cutting blocks read in advance in a manner such that the travelling time can be minimized on the basis of fast feed speeds of the W axis and the Z axis which are specified in advance.

[Step SA14] The cooperative drive analysis unit 14 performs the analysis in such a way that the movement of the tool can be achieved by only movement of Z axis without movement of W axis for the cutting feed blocks read in advance excluding a block where only movement of the Z axis does not give a sufficient stroke and movement of the W axis is required. Regarding such a block where only movement of the Z axis does not give a sufficient stroke and movement of the W axis is required, the cooperative drive analysis unit 14 performs the analysis in such a way that the W axis and the Z axis are cooperatively driven so that the movement of the W axis is minimized. The process then returns to step SA04.

Figure 6:
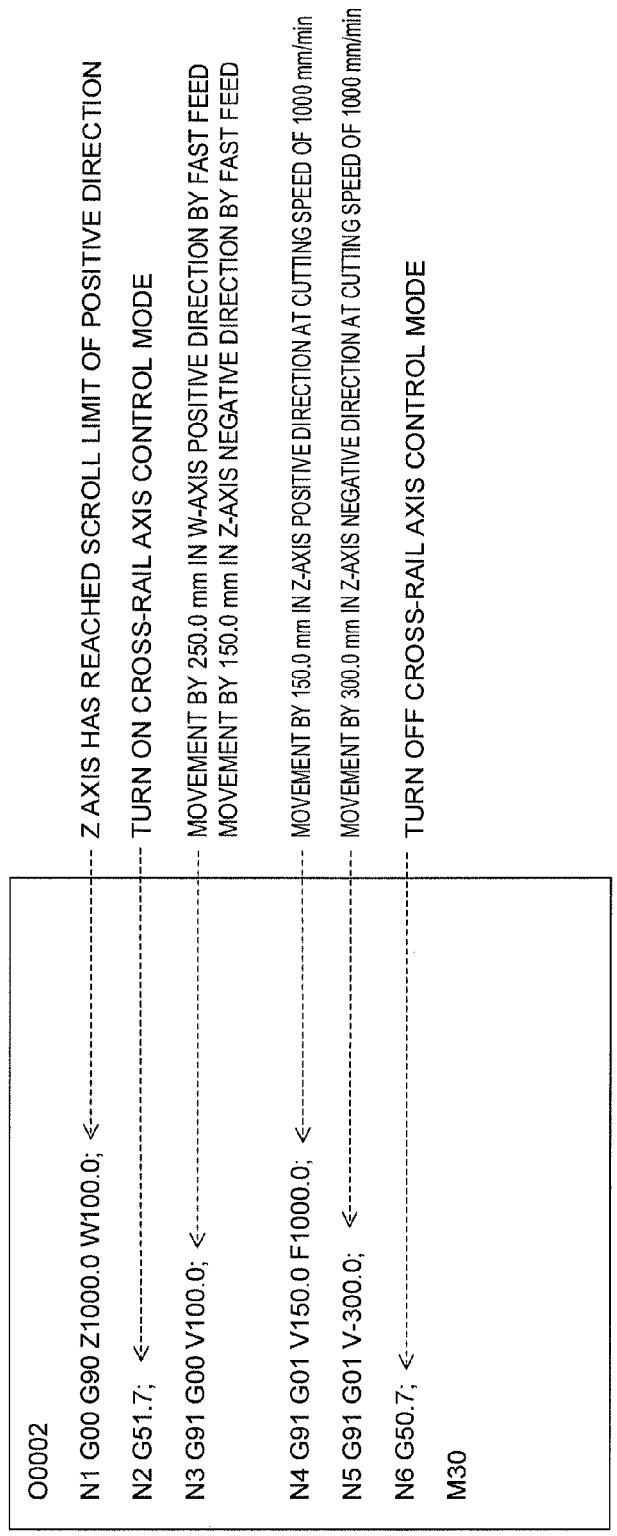
FIG. 6 shows an example of a program of the cooperative action control shown in FIG. 5.

FIG. 5 shows an example of the action of the numerical controller 1 according to the present embodiment in a case where a block containing a fast feed command to the V axis in the cross-rail axis control mode is followed by cutting feed commanding blocks over continuous two blocks. FIG. 6 shows an example of an NC program that achieves the action in FIG. 5. In FIG. 5, the solid-line thick arrow represents a stroke of the Z axis, and the open arrow represents a stroke of the W axis. The reference characters N3 to N5 with which the arrows showing feed action in FIG. 5 are labeled represent block numbers of corresponding feed commands in the NC program in FIG. 6. Further, it is assumed that the stroke limit of the Z axis is 1000 mm.

An NC program O0002 in FIG. 6 first performs control in which the positive scroll limit of the Z axis is reached in the block N1. In this situation, the cross-rail axis control mode is turned on in the block N2, and the block N3, which is a fast feed commanding block, is then read. At this point, the numerical controller 1 according to the present embodiment refers to the block N4, which follows the block N3 and is a cutting feed commanding block, and therefore determines that the block N3 contains a fast feed command that moves the cutting tool to the cutting feed start point (to step SA07 in FIG. 4).

The blocks N4 and N5, each of which contains a cutting feed command block, are then read in advance, and the V-axis movement range based on the cutting feed blocks is identified (step SA09 in FIG. 4). Since in the block N4 in FIG. 6, an incremental command (G91) commands movement of the V axis in the positive direction over 150.0 mm (V150.0), and in the block N5, an incremental command (G91) commands movement of the V axis in the negative direction over 300.0 mm (V-300.0), the travel of the V axis from the cutting feed start point is 300 mm at the maximum over a range of ±150. Since the movement range is allowed within the Z-axis scroll limit of 1000 mm, the cooperative drive analysis unit 14 allocates the fast feed travel in the block N3 to the W axis and the Z axis in such a way that the Z-axis position at the cutting feed start point is adjusted so that the cutting feed in the blocks N4 and N5 is achieved by movement of only the Z axis.

As an example of a method for allocating the fast feed travel to the W axis and the Z axis, for example, in a series of cutting feed blocks, the range of possible Z-axis coordinates is specified on the basis of the travel in the positive direction of the V axis and the travel in the negative direction of the V axis with respect to the cutting feed start point, and the fast feed travel is distributed to the W axis and the Z axis in such a way that the combination of the travel of the W axis and the travel of the Z axis is equal to the travel commanded by the fast feed command within the specified range and the travelling time for which the fast feed of the W axis and that of the Z axis are performed is minimized. In the present example, to execute movement commands in the series of cutting feed blocks by only the Z axis, the V-axis cutting feed travel can be achieved by only movement of the Z axis when the Z-axis coordinate at the cutting feed start point falls within a range from 150.0 to 850.0 mm. Since the block N3 commands movement of the V axis in the positive direction over 100.0 mm, movement of the Z axis in the negative direction by the amount ranging from 150.0 to 850.0 mm may be achieved by movement of the W axis in the positive direction by the amount ranging from 250.0 to 950.0 mm. Among movement range combinations, a combination of movement of the Z axis in the negative direction over 150.0 mm and movement of the W axis in the positive direction over 250.0 mm minimizes the travelling time.

When cutting feed commands are present continuously over at least two blocks, and only movement of the Z axis does not give a sufficient stroke and movement of the W axis is required, the W axis and the Z axis are moved by fast feed (G00) toward the cutting feed start point so that that the movement of the tool can be achieved by only movement of Z axis without movement of W axis for greatest possible number of continuously commanded blocks, such that the travelling time can be minimized on the basis of fast feed speeds of the W axis and the Z axis which are specified in advance. Regarding a block where movement of the W axis is required, the W axis and the Z axis are cooperatively driven so that the movement of the W axis is minimized.

The example described above will be described with reference to FIGS. 5 and 6. It is assumed in FIG. 5 that the stroke limit of the Z axis is set to 200 mm instead of 1000 mm, as a result, Z200 is set in the block N1 instead of Z1000, and that Z axis has reached a stroke limit in the positive direction due to movement in the block N1. In this case, the block N4, which commands movement of 150 mm, allows movement of the Z axis, whereas the block N5, which commands movement of 300 mm, does not give a Z axis alone a sufficient stroke, requiring movements of the W axis as well as the Z axis. Therefore, in the movement in the block N3, movement of the Z axis by 150 mm is performed by fast feed in the negative direction, and movement of the W axis by 250 mm is performed by fast feed in the positive direction. As a result, in the block N4, movement of the Z axis by 150 mm is performed at a cutting speed of 1000 mm/min in the positive direction, and in the block N5, movement of the Z axis by 200 mm is performed in the negative direction and movement of the W axis by 100 mm is performed in the negative direction. The cutting speed in the block N5 is limited, for example, to 500 mm/min because movement of the W axis is involved.

As described above, adjustment of the positions of the Z axis and the W axis in the fast feed to the cutting feed start point allows cutting feed to be performed with a Z-axis movement command alone or with a movement command which minimizes movement of the W axis, in the movement to a middle point in the cutting feed in the following block N4 and the movement to the cutting feed end point in the block N5.

The embodiment of the present invention has been described above, but the present invention is not limited only to the embodiment described above and can be implemented in a variety of aspects with appropriates changes made to the embodiment.

For example, in the embodiment described above, the cooperative drive analysis unit 14 has been described as functional means different from the program analysis unit 11, but the cooperative drive analysis unit 14 may be implemented as secondary functional means of the program analysis unit 11.

The invention claimed is:

1. A numerical controller that allows machining of a workpiece by controlling a machine based on a program, the numerical controller comprising:
   a first axis that directly moves a tool; and
   a second axis that indirectly moves the tool in association with a movement of the first axis in a direction in which the first axis moves;
   wherein the movement of the first axis and a movement of the second axis are allowed to be commanded in the program in such a way that the first and second axes are taken as one virtual axis, and the numerical controller further comprises:
   a program read unit that sequentially reads blocks in the program; and
   a cooperative drive analysis unit configured to distribute, when a block read by the program read unit contains a block of fast feed command to the virtual axis for moving the tool to a cutting feed start point, a moving amount commanded by the fast feed command to the first axis and the second axis, and wherein
   the cooperative drive analysis unit is configured to distribute the moving amount commanded by the fast feed command to the first axis and the second axis so that movement of the virtual axis commanded by continuous blocks of cutting feed command that follow the block of fast feed command in the program can be achieved by movement of only the first axis.

2. The numerical controller according to claim 1, wherein, when the movement of the virtual axis commanded by the continuous blocks of cutting feed command that follow the block of fast feed command in the program can not be achieved by movement of only the first axis, the cooperative drive analysis unit
   first adjusts the movement of the first axis and the movement of the second axis based on the continuous cutting feed commands so that a movement of the second axis in the continuous cutting feed commands is minimized, and then distributes the moving amount commanded by the fast feed command to the first axis and the second axis so that the adjusted movements of the first axis and the second axis based on the continuous cutting feed commands are enabled.

3. The numerical controller according to claim 1, wherein the cooperative drive analysis unit is configured to distribute the moving amount commanded by the fast feed command to the first axis and the second axis so that travelling times of the first axis and the second axis based on the fast feed command are minimized.

4. The numerical controller according to claim 2, wherein the cooperative drive analysis unit is configured to distribute the moving amount commanded by the fast feed command to the first axis and the second axis so that traveling times of the first axis and the second axis based on the fast feed command are minimized.

\* \* \* \* \*